Aug. 31, 1965  W. A. KAEPERNIK  3,203,220
SURGICAL STAPLE APPLICATOR
Filed July 24, 1963  2 Sheets-Sheet 1
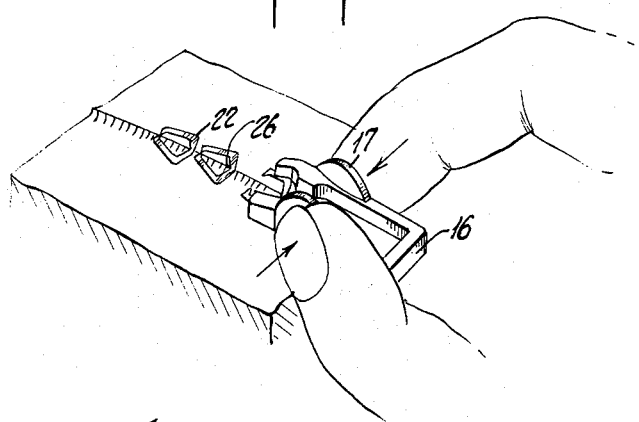
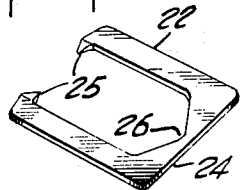
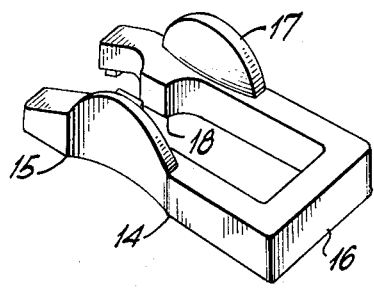
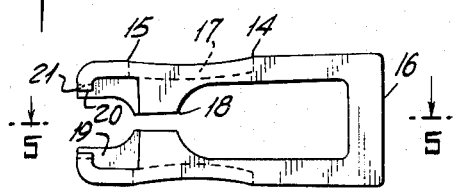
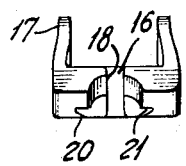
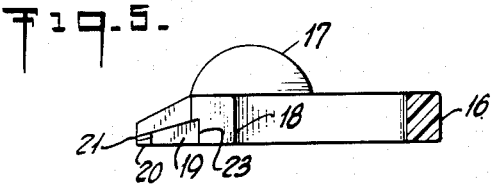
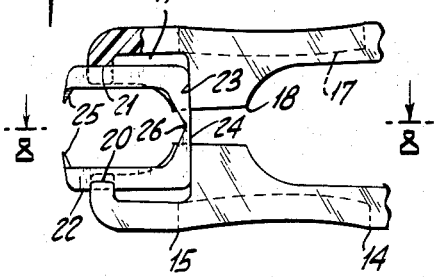
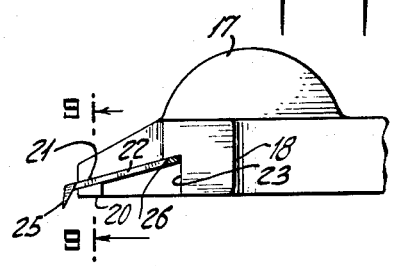
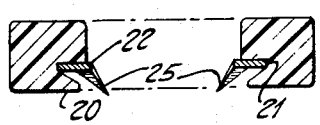
INVENTOR
William A. Kaepernik
BY
ATTORNEY Aug. 31, 1965  W. A. KAEPERNIK  3,203,220
SURGICAL STAPLE APPLICATOR
Filed July 24, 1963  2 Sheets-Sheet 2
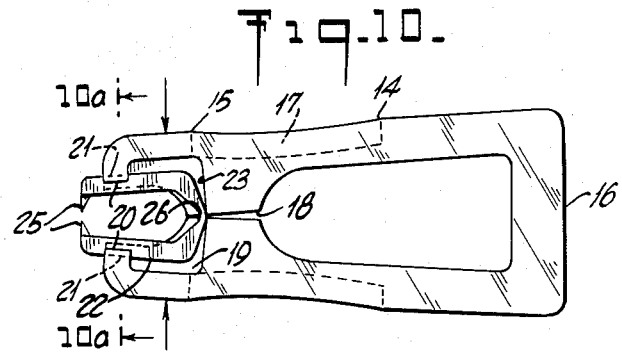
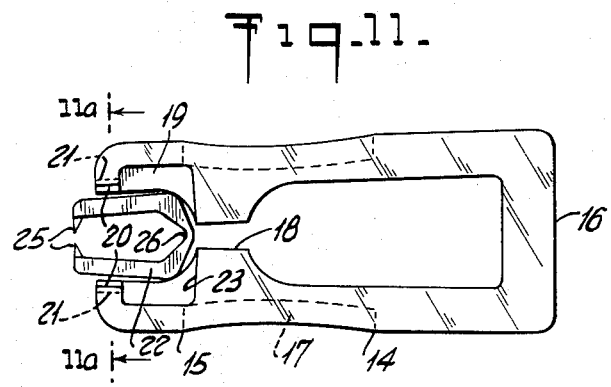
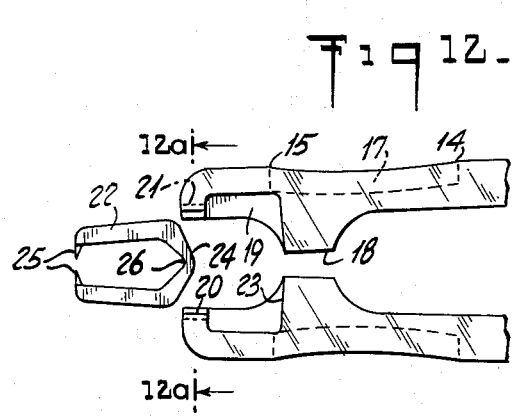
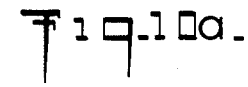
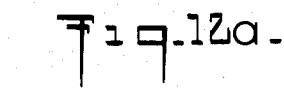
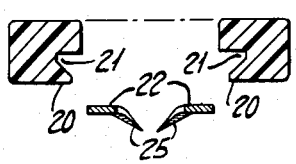
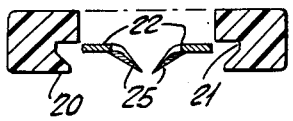
INVENTOR.
William A. Kaepernik
BY Robert W. Kell
ATTORNEY United States Patent Office 3,203,220
Patented Aug. 31, 1965

3,203,220
SURGICAL STAPLE APPLICATOR
William A. Kaepernik, Somerville, N.J., assignor to Ethicon, Inc., a corporation of New Jersey
Filed July 24, 1963, Ser. No. 297,379
2 Claims. (Cl. 72—410)

This invention relates to a simplified instrument for applying clips to the surface of a wound whereby the separated edges of skin are drawn together and retained in an abutting position until healing can take place.

In the practice of medicine, cuts in the skin, whether caused by accident or surgical incision, are closed by drawing together the cut edges of skin and holding them together until healing takes place. For many years this was accomplished by suturing with thread, such as cotton or silk. More recently, skin clips of metal have been applied to surface wounds with excellent results as such clips may be rapidly applied and will hold the cut sections together until healing takes place. The metal clips may then be easily removed and since such clips do not penetrate far below the surface of the skin, the discomfort to the patient is less than that caused by withdrawing thread.

It is an object of the present invention to provide an exceedingly simple suturing instrument that may be individually packaged and readily retained in a sterile condition until required for use.

Another object of the present invention is to provide an instrument for applying clips to close a wound so inexpensive that it may be used once and then discarded.

These and numerous other objects and advantages of the invention will become apparent from the following detailed description of a preferred form thereof, and from an inspection of the accompanying drawings in which:

FIG. 1 is a full scale perspective view showing the operation of the clip applicator.

FIG. 2 is an enlarged perspective view of a metal clip suitable for use with the applicator of the present invention.

FIG. 3 is an enlarged perspective view of the skin clip applicator illustrated in FIG. 1.

FIG. 4 is a full scale inverted plan view of the applicator.

FIG. 5 is a horizontal cross-sectional taken on the lines 5—5 of FIG. 4.

FIG. 6 is an end view of FIG. 4 looking from the left.

FIG. 7 shows an enlarged fragment of FIG. 4 with the skin clip held in position.

FIG. 8 is a horizontal cross-section on the line 8—8 of FIG. 7.

FIG. 9 is a horizontal cross-section taken on line 9—9 of FIG. 8 showing more clearly the guides for the legs of the skin clip.

FIG. 10 is an enlarged inverted plan view of the applicator and illustrates the position of the applicator at the time that a clip is applied.

FIG. 10a is a horizontal cross-section taken on line 10a–10a of FIG. 10.

FIG. 11 is an enlarged inverted plan view of the applicator and illustrates the position of the applicator immediately after the clip has been applied.

FIG. 11a is a horizontal cross-section taken on line 11a–11a of FIG. 11.

FIG. 12 is an enlarged inverted plan view of the applicator and illustrates the withdrawal of the applicator away from the clip; and FIG. 12a is a horizontal cross-section taken on the line 12a–12a of FIG. 12.

Referring now to the drawings and particularly to FIG. 3 thereof, the numeral 14 indicates generally a U-shaped applicator that is preferably molded of a thermo-plastic material. The applicator comprises a pair of symmetrical slightly converging side arms 15 interconnected at the rear edge 16. Apposed finger grips 17 are molded integral with the applicator and extend upward to provide a suitable area for gripping. These finger grips are so located that the metal clip normally carried by the applicator is clearly visible at the time of use. A pair of stops 18 project inwardly from the side arms 15 and serve to limit the convergence of the side arms when pressure is applied to the grips 17. The applicator is manufactured so that the side arms converge slightly as may be seen from FIG. 4 and these side arms, in their normal position, are separated by a distance slightly less than the width of the metal clip to be applied.

As may be seen from FIGS. 4 and 5 the interior edge of the side arms 15 are recessed to receive a metal clip of the type illustrated in FIG. 2. The forward edge of the recess 19 is shaped to form jaws 20 that bear against the metal skin clip when it is in position. These jaws are notched to form a guideway 21 which frictionally engages and slideably supports the forward edge of the clip. The applicator is constructed of resilient material and the thickness and width of the side arms 15 are such that they will yield under pressure and bend the forward edges 22 of the clip inwardly when it is desired to apply the clip. As shown in FIG. 7, when the clip is in position in the applicator the pressure of the jaws as they bear against the forward edges of the skin clip in the guideway holds the clip securely in position against the rear edge 23 of the recess.

An important feature to the understanding of the present invention resides in the clips that are used with the applicator 14. As seen in FIG. 2 the clip is formed of sheet material preferably metal. In the particular embodiment illustrated, the body of the clip is plainer and generally U-shaped with a rear bail portion 24 and forwardly extending leg portions 22. A pair of pointed tines 25 are inclined downward and toward each other from the front edge 22 of each clip. The center of the rear edge 26 is reduced in cross-section. With this arrangement pressure on the sides of the clip by the jaws serve to bend the leg portions 22 and will cause the tines 25 to move toward each other. When the clip is pressed onto a wound, pressure on the front edges of the clip causes the tines to penetrate the skin to bring the margins together. The instrument of the present invention may be assembled with a single clip in place as illustrated in FIG. 7. Lateral movement of the clip is prevented by the pressure of the jaws 20 which frictionally hold the clip in the guideway 21. Vertical movement of the clip is prevented by the shoulder 23 at the back end of the recess. Longitudinal movement of the clip is restricted in one direction by the shoulder of the recess, but is not so restricted in the opposite direction.

The instrument with a clip in place may be sterilized either before or after packaging. It is most convenient to seal each skin clip and applicator in an individual package as the entire unit will then remain sterile until the package is opened just prior to use.

As best indicated in FIG. 1, in applying a skin clip to close a wound, the instrument is placed against the wound with the points of the clips properly positioned. Pressure is then exerted against the finger grips in the direction of the arrows to force the jaws toward each other bending the legs of the clip. FIGS. 10 and 10a show the relative position of the clip with respect to the applicator at the time the clip is applied. The points 25 which are downwardly inclined and which extend toward each other penetrate the skin around the wound. Then, when pressure or the finger grips is removed, the jaws move apart due to the resilience of the material of which the instrument is constructed as shown in FIGS. 11 and 11a. This leaves the clip imbedded in the skin to hold the wound margins together and the instrument may easily be withdrawn from the clip as indicated by FIGS. 12 and 12a.

The fact that the points of the clip are downwardly inclined from the body of the clip and the applicator, see FIGS. 8 and 9, is important because when the applicator is used to applying clips to the wound, the applicator need only be held at a comparatively small angle with the surface of the wound. This substantially eliminates pressure on the wound which might otherwise be necessary if the points were generally in the plane of the body of the instrument so that the applicator would have to be applied to the wound at a substantial angle, e.g., in excess of 45°.

The invention may be embodied in other forms without departing from the spirit or essential characteristics thereof as set forth in the claims. The present embodiment is therefore to be considered as illustrative and not restrictive, and it is intended to include all changes which come within the scope and range of the claims.

What is claimed is:

1. A one use applicator for a U-shaped suturing clip whose legs are squeezed inwardly to effect its suturing function, comprising a holder having a pair of spaced arms adapted to accommodate a suturing clip between them at a first end of said applicator, a member connecting said arms together at a position spaced from said first end, opposed means presented by said arms adjacent said first end of the applicator for engaging the outer lateral edges of the U-shaped clip and located so that the legs of the clip in its normal position in the applicator spreads the arms thereof beyond a normal position outwardly frictionally to hold said clip in its position in the holder with the rear edge of the clip unsupported, and means also presented by said arms to arrest their movement toward each other in a position inwardly of said normal position; said arms being movable toward each other to effect the application of said clip, and movable away from each other to normal position under the resiliency of the material of the holder, to release said clip whereby to permit removal of the holder from the clip in its applied position and discarding of the holder.

2. A disposable applicator for applying U-shaped clips comprising:

A pair of laterally spaced apart slightly converging side arms and an interconnecting rear edge;

Opposed finger grips projecting upwardly from the dorsal surface of each side arm and located behind the front edges thereof, a distance substantially equal to the length of an individual clip;

Opposed abutment means projecting inwardly from each of said side arms and positioned to limit converging movement of the side arms when pressure is applied to said finger grips;

A recess formed in the interior ventral edge of each side arm for receiving the clip, the length of said recess being slightly less than the length of the clip and said recess uniformly increasing in depth with the distance from the forward edge of the recess to form a surface inclined with respect to the horizontal plane of the clip applicator; and, A clip receiving guideway in the forward interior edge of each of said arms, said guideways being in alignment with the inclined surface of the recess and engaging and frictionally supporting the clip.

References Cited by the Examiner

UNITED STATES PATENTS

| | | | |
|---|---|---|---|
| 715,612 | 12/02 | Van Schott | 1—349 X |
| 721,480 | 2/03 | Van Schott | 1—349 |
| 2,648,065 | 8/53 | Stichs | 1—349 |
| 3,110,899 | 11/63 | Warren | 1—349 |
| 3,150,379 | 9/64 | Brown | 1—349 |

GRANVILLE Y. CUSTER, Jr., *Primary Examiner.*